United States Patent [19]

Ashkenazi

[11] Patent Number: 5,515,594
[45] Date of Patent: May 14, 1996

[54] METHOD OF INSERTING A COIN RETURN HOUSING INTO A TELEPHONE PAYSTATION

[75] Inventor: Ellis Ashkenazi, Irvine, Calif.

[73] Assignee: Calstar Technologies, Inc., Anaheim, Calif.

[21] Appl. No.: 377,636

[22] Filed: Jan. 26, 1995

Related U.S. Application Data

[62] Division of Ser. No. 95,307, Jul. 21, 1993, Pat. No. 5,411, 207.

[51] Int. Cl.$^6$ .................................................. B23P 11/00
[52] U.S. Cl. .................................................. 29/434
[58] Field of Search .................. 29/434, 428; 232/57.5; 379/145

[56] References Cited

U.S. PATENT DOCUMENTS 5,146,492  9/1992  Stone et al. ............................ 379/145

Primary Examiner—David P. Bryant
Attorney, Agent, or Firm—James G. O'Neill

[57] ABSTRACT

An improved method of inserting a coin return into an opening in a telephone paystation enclosure including the steps of inserting the housing of the coin return into an opening until a pivot area of the housing is aligned with and placed over a lower part of the opening; then pivoting the housing around the pivot area into the interior of the enclosure until a portion of an outer lip of the housing contacts a portion of the exterior surface of the enclosure and an upper slotted opening formed in the housing is aligned with a top surface of the opening; then pushing the housing upwardly until the top surface of the opening in the enclosure bottoms out in the upper slotted opening; then rocking the housing inwardly, past the pivot area, until a further portion of the interior surface of the outer lip of the housing contacts the exterior surface of the enclosure and a lower, slotted opening formed in the housing is aligned with a bottom surface of the opening; then allowing the housing to drop until the lower slotted opening bottoms out against the bottom surface of the opening.

7 Claims, 3 Drawing Sheets

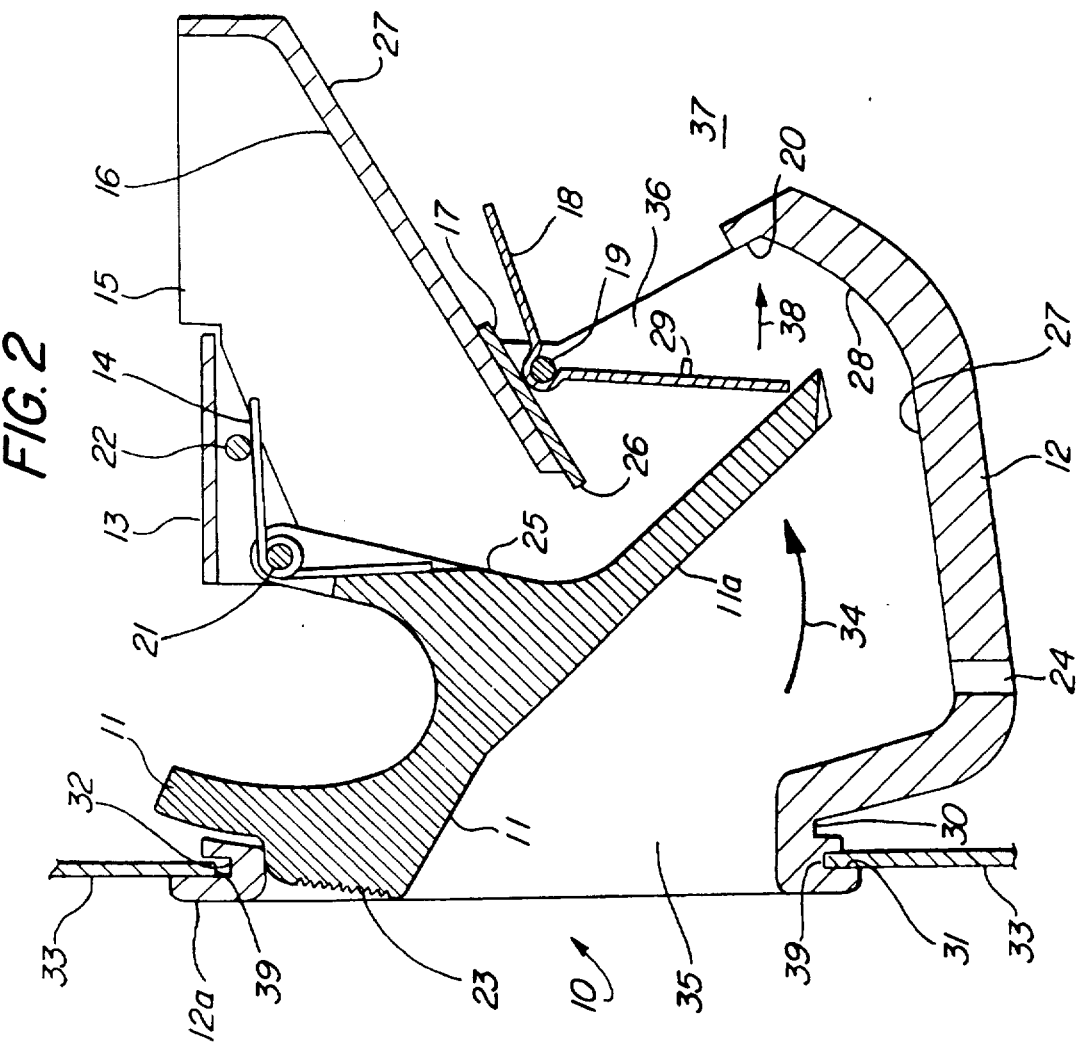
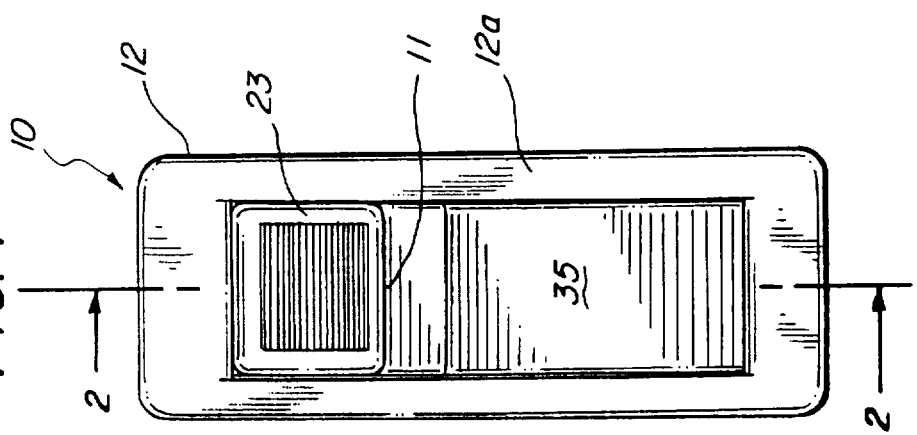

METHOD OF INSERTING A COIN RETURN HOUSING INTO A TELEPHONE PAYSTATION

This is a division of application Ser. No. 08/095,307, filed on Jul. 21, 1993, now U.S. Pat. No. 5,411,207.

BACKGROUND OF THE INVENTION

1. Field of the Invention

This invention relates generally to telephone paystation coin returns, and more particularly, to an improved protective coin return for a telephone paystation.

2. Description of Related Art

As is well known, increasing the security of coin operated telephones or paystations installed in public places has long been a factor in their design. The exterior of such paystations, and particularly the coin return area of known telephone paystations are vulnerable to thieves, vandals, or the like (hereinafter collectively referred to as "vandals"), and proposed solutions for solving this area of vulnerability have failed to provide adequate protection to the existing paystations. For example: persistent and resourceful vandals utilize tools to pry existing coin returns from the paystation housings; stuff various flexible materials through the opening in these coin returns; and/or insert and ignite cherry bombs, M-80s or other explosive materials through the openings and behind the pivoting doors mounted in such openings. Such vandalism causes widespread inconvenience and problems, and costs millions of dollars each year. This is graphically spelled out in a recent study done by New York Telephone ("NYT") and published in the May 1993 issue of Public Communications Magazine, wherein it stated that it costs NYT over $10,000,000 per year to repair or replace payphones located in New York city. The study specifically pinpointed cherry bombs, or other explosive devices inserted in coin returns, as the cause of much of the damage and resultant costs.

With the expected continued rise in revenues to be taken in by telephone paystations over the years, it is obvious that they will become an even more attractive and lucrative target for vandals. In an attempt to dissuade vandals, numerous attempts have been made to prevent the stuffing of flexible materials, or the insertion of explosives, into the coin returns of telephone paystations. Such attempts include: adding exterior doors to the coin returns; adding armor around the coin return, or the door of the coin return; adding devices to the interior surface of the existing coin return door; the modification of the exterior coin return opening; the modification of the interior of the coin return door; the modification of the coin retrieval portion of the coin return; or the modification of the coin return chute. However, particularly in large metropolitan areas, such as New York City, this added protection, new devices, or modifications to the coin returns do not solve all of the problems, or prevent the need for expensive repairs or replacements of telephone paystations.

Examples of suggested prior art solutions are shown in the following U.S. Patents:

| | |
|---|---|
| 2,922,571 ("'571") | 5,131,035 ("'035") |
| 4,946,095 ("'095") | 5,146,492 ("'492") |
| 4,966,325 ("'325") | 5,193,113 ("'113") |
| 5,018,193 ("'193") | |

The '571 patent discloses a change return device which includes a link member attached between the rear of the change return door and a pivotable change return chute to rotate or pivot the chute out of alignment when the change return door is opened, to thereby prevent stuffing of materials into the coin chute.

The '095, '325 and '193 patents disclose change return protection devices attached to the rear of a change return door to seal off the change return chute when the change return door is opened. The '095 and '193 patents also include blocking flaps and/or slot backing plates to further prevent insertion of flexible materials into the coin return chute and to provide protection against explosives.

The '035 patent discloses a U-shaped shield welded to the paystation over the coin accumulation and coin return areas on the lower housing of the paystation. This U-shaped protective shield or plate is fixed or secured over the outside of the existing lower housing and covers the coin return opening to provide limited access into the coin return opening. A door is pivotably mounted to the interior of the U-shaped protective shield over the coin return opening and is dimensioned so as to provide a relatively small coin return access opening to help prevent stuffing of the coin return area.

The '492, and '113 patents disclose change return protection devices having modified coin chutes or special covers attached to the change return door to inhibit or prevent the insertion of explosive devices and/or stuffing materials into the change return chute when the change return door is opened. The '492 patent also includes a flap gate pivoted in the coin return passage to allow only one coin at a time to pass into the coin return area for retrieval.

Although the devices and modifications set forth in the above-identified patents have prevented some of the known problems and hindered vandals in some situations, they have not been successful in preventing the stuffing of all explosive or flexible materials into or adjacent the coin returns, thereby still allowing determined vandals to steal coins from or disable such paystations. Additionally, these known devices and modifications do not consistently prevent damage to the internal components of the paystation or to the coin return itself when explosive materials are inserted therein, or applied to the exterior surface area around the coin return opening. Finally, some of the disadvantages of adding protective plates or covers to the lower housing or coin return door of a paystation, as set forth in some of the prior art patents, is that they actually deflect the gasses or explosive force of any explosives detonated therein into the telephone enclosure and the internal components thereof. Or, the added weight of such protective covers make the coin box more difficult and cumbersome to open and remove. Or, the added cover offers sharp edges or surfaces that a vandal may use as an application point for prying tools. Additionally, the adding of covers or plates to existing equipment in paystations may add significantly to their cost, which added cost cannot always be justified.

Therefore, there still exists a need for a dependable coin return protection means which is low in cost, easy to manufacture and install, and which overcomes the problems set forth above.

The invention disclosed herein overcomes many of the above-mentioned limitations and problems as well as additional problems, such as drug dealers or others using telephone paystation coin returns for drug deals or other nefarious schemes. This is usually accomplished by inserting drugs, syringes, or other unwanted items behind coin return doors for collection by a third party. However, an unsuspecting payphone user reaching for change after attempting to use the telephone may come in contact with the drugs, or be harmed by the syringes or other items inserted therein. Applicant's novel device overcomes this problem, and others, by the provision of an improved, protective coin return having no coin return door at the front of the opening behind which items may be hidden. Applicant's device does include an outer sweep flap having a downwardly extending leg portion, and at least one cooperating inner flap which allow any materials stuffed into the opening to be seen, or to be swept from the coin return retrieval area through a rear opening. The internal cooperating flaps also dissipate and block the force of any explosive materials inserted and exploded in the coin return to prevent any damage to the coin return, the telephone paystation enclosure, and/or the internal components of the telephone. Furthermore, the improved coin return of the present invention may be used for new telephone paystations installations, or, in its preferred embodiments, is readily adapted for use with existing telephone paystations to provide added security to the coin return area.

SUMMARY OF THE INVENTION

Accordingly, it is a general object of the present invention to provide an improved coin return for a telephone paystation.

It is a particular object of the present invention to provide an improved coin return for a telephone paystation which is adapted to be securely attached in existing telephone paystation enclosures.

It is a still more particular object of the present invention to provide an improved coin return for a telephone paystation which is designed to foil vandals.

It is yet a more particular object of the present invention to provide an improved coin return for a telephone paystation having protective internal and external flap means to prevent vandalism, and to both dissapate and block the explosive force of any materials detonated therein.

It is a further particular object of the present invention to provide an improved coin return for a telephone paystation having novel coin deflection and path means.

It is yet another particular object of the present invention to provide an improved coin return for a telephone paystation which includes an easily operated sweep means to permit easy actuation of an external flap means so as to sweep any materials inserted therein out of the coin path and to block the coin chute.

It is a still further particular object of the present invention to provide an improved coin return for a telephone paystation having pivoting inner and outer flap means.

It is yet a further particular object of the present invention to provide an improved coin return for a telephone paystation having no outside door, and an integrated design that blends with and is more securely fastened in existing paystations.

It is yet a still further particular object of the present invention to provide an improved coin return for a telephone paystation assembly having cooperating pivotable inner and outer flap means forming a portion of the coin path and providing enhanced security for the coin return and the telephone paystation enclosure.

And, it is a final particular object of the present invention to provide an improved coin return for a telephone paystation having a plurality of exterior and interior flap means fabricated from stainless steel, which may be easily manufactured and readily incorporated into existing telephone paystations to provide a stronger coin return, and substantially block and diminish the force of any explosives detonated therein.

In accordance with one aspect of the present invention, there is provided an improved coin return assembly for a telephone paystation with a pivotable outer flap means incorporating a portion of the internal coin path and having a downwardly depending leg portion which sweeps any inserted materials contacted thereby out of the coin path, and at least one internal flap means pivotably mounted to a wall, within the coin path, which cooperates with the outer flap means to aid in substantially blocking any explosive force, or resulting gasses from an explosive detonation therein, from entering the internal areas of the payphone. The at least one internal flap means also acts to guide coins in the coin path so as to properly exit into a coin retrieval cavity for retrieval by a payphone user.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 1 is a front elevational view of an improved coin return of the present invention;

FIG. 2 is a sectional view, taken along line 2—2, of the coin return of FIG. 1, inserted in a telephone paystation enclosure;

DESCRIPTION OF THE PREFERRED EMBODIMENTS

Figure 3:
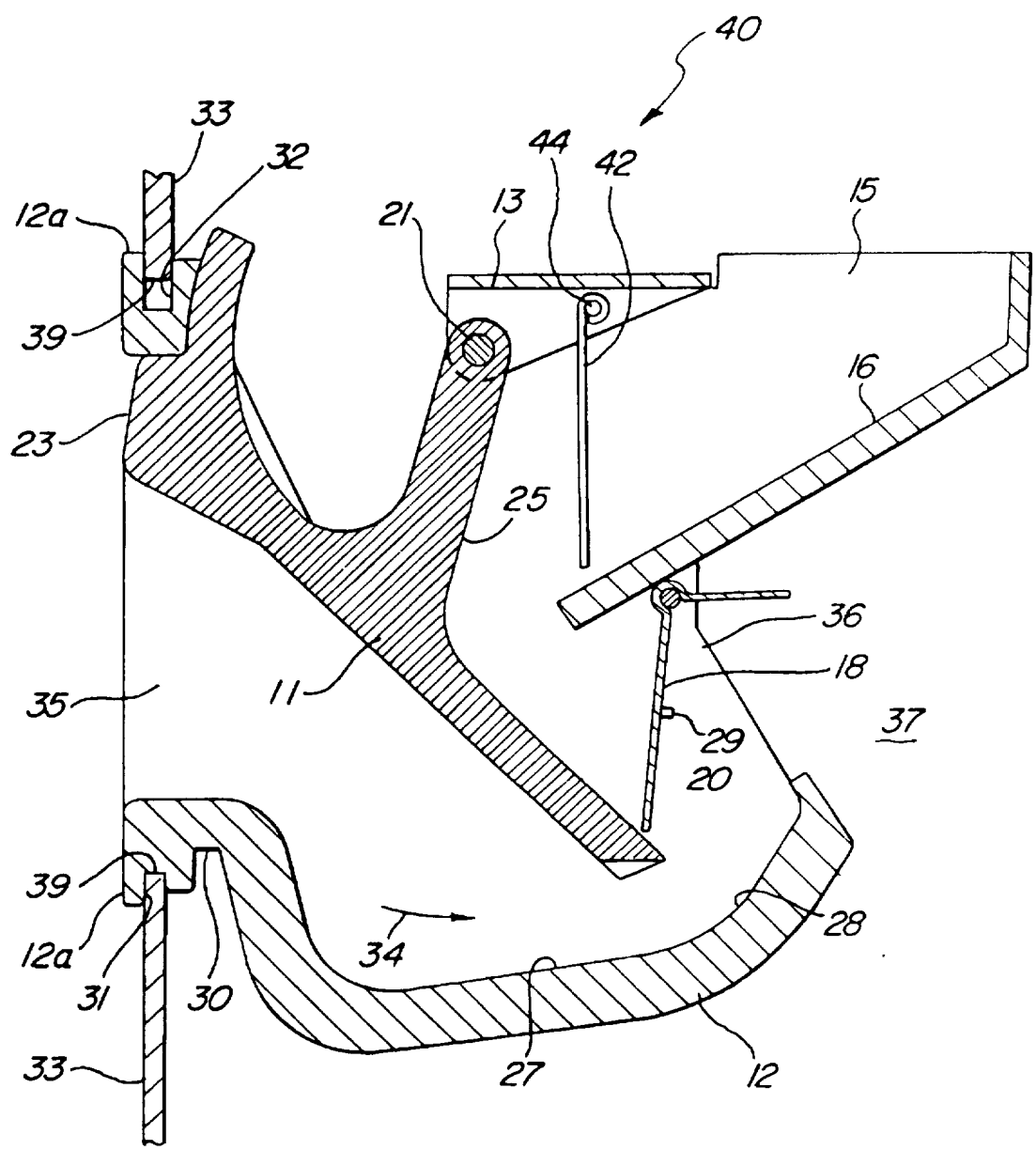
FIG. 3 is a sectional view of a further embodiment of the improved coin return.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to describe an improved protective coin return for a telephone paystation assembly, identified generally at 10.

Turning first to FIGS. 1–2 of the drawing, the preferred embodiment of the coin return 10 is shown inserted a telephone paystation enclosure 33. The coin return 10 includes an exterior housing 12 comprised of two halves or cooperating components. These halves are made from zinc, stainless steel, or the like, and secured together, in any manner known to those skilled in the art, to form the housing 12. The housing 12 has no exterior door, but includes an outer sweep or flap means 11, shaped and dimensioned so as to snugly fit into the rectangular interior thereof. The sweep means 11 is pivotably mounted about a pin or point 21, and includes a downwardly depending leg portion 11a, which is dimensioned to allow coins to pass under its lower end, but acts to sweep any materials inserted through the open front portion 35 of the housing 12, and which are contacted by this lower leg portion 11a, out of the coin path. Any material contacted by and swept rearwardly by leg 11a will be pushed through a rear opening 36, into a storage area or opening 37 in the telephone paystation enclosure, for retrieval and disposal at a later date. The sweep means 11 also includes a front actuating means or knob 23 which, when pushed, pivots the sweep means around the pivot pin 21, in the direction of the arrow 34. The sweep means 11 may be allowed to return to its rest position shown in FIGS. 1 and 2 by gravity, or may include a biasing means, such as a spring 14, mounted to the pivot means 21 and to assist in biasing the sweep means assembly 11 into its rest position. The biasing means 14, if used, preferably includes a pair of resilient arms which coact with a flattened portion of interior surface 25, forming a portion of the internal coin path, of sweep means 11 and a pin or stop means 22 held in or forming a part of a bracket 13, formed to or captured in the housing 12, in a known manner. The housing 12 is in turn securely mounted in the telephone paystation enclosure 33, in a manner described more fully below.

The internal coin path of housing 12 also includes an internal coin slide or chute 16 connected in a known manner to the normal coin return means from a telephone paystation in the enclosure 33, via a coin entry opening 15. That is, coins are dropped from the telephone paystation into opening 15, in a known manner, hit and roll or slide down chute 16, pass around the end of chute 16 and between edge 26 of a knife means 17, and an aligned, arcuate portion of interior surface 25, forming a portion of the internal coin path. The coins then pass through or under a pivotable inner flap 18, down a slide area 28 below the lower end of leg 11a, and into coin retrieval area or cavity 27. If the flap 18 is for any reason blocked or held in place, the coins will not pass under this flap, but will be backed-up or held in position behind the flap. Because of the open front 35 of the coin return 12 of the present invention, the explosive force of any materials detonated in or near the coin return will be dissipated or expelled outwardly through this open front. Furthermore, a person using the telephone paystation can see into the coin retrieval area 27 through the open front to ascertain if there are any coins, foreign objects, or other materials therein. If any materials are located therein, or no coins are seen, the materials may be removed through the front opening 35 or pushed or swept from the coin path by pushing on knob 23 to pivot the sweep means 11 and flap means 18. The actuation of the knob 23, sweep means 11 and flap 18, will not only push unwanted materials through opening 36 by means of depending leg 11a, but will then also allow any coins backed up behind flap 18 to pass by the unclogged flap 18 and to exit between the end of leg 11a and coin slide 28, into coin retrieval area 27. The coins may then be retrieved by the telephone user from coin retrieval area 27 by inserting a finger into opening 35 and sliding the coins out. A hole 24 may be provided in the bottom of coin retrieval area 27 to allow any condensation or moisture collected therein to be drained away.

The sweep means 11, 11a and flap assembly 18, as well as the remaining components of the coin return housing 12, are fabricated to exacting tolerances and are made from strong, rigid, and secure high strength materials, such as stainless steel, or if to be used in certain less vulnerable areas, steel, or the like. These high strength materials must be strong enough to resist tampering with by vandals. The internal flap assembly 18 is pivotably mounted on a pivot pin 19, and is actuated by gravity or, preferably, includes a pair of resilient arms, as shown in FIG. 2, so as to aid gravity in biasing the flap into its rest position. This flap assembly 18 is dimensioned so that it fits snugly in the coin path, with the end of its downwardly extending leg coacting with the internal surface 25, forming a portion of the coin path, of the depending leg portion 11a. Flap assembly 18 prevents any flexible materials from being inserted into the coin path behind the leg 11a. Also, if an explosive device is detonated in the coin return, the flap assembly 18 will be rotated by the force of the explosion into more solid contact with the coin path 25 to thereby form a seal to prevent any explosive force or vapor from reaching the internal components of the payphone. The rear of the downwardly extending leg of flap 18 includes a sharpened means, such as a pin 29, to burst any balloons or other inflatable items inserted behind the flap in an attempt to block the flap from swinging freely in the direction of arrow 38.

When looking at FIG. 2, if the knob 23 of the sweep means 11 is pressed inwardly, in the direction of arrow 34, toward the coin chute 16, the interior surface 25 of leg 11a, forming a portion of the coin path, will press against the lower or outer end of the downwardly extending leg of interior flap 18, to move flap 18 in the direction of the arrow 38, toward the rear opening 36 until the lower ends of leg 11a and flap 18 contact a stop portion or wall 20 formed in or to the housing 12, to thereby both stop the movement of sweep 11 and completely block-off the opening into the coin path and coin chute 16. At the same time, any material (other than any coins, of course) in the coin slide area 28, or coin path, will be pushed or swept by the leg 11a through rear opening 36 and into compartment 37.

Referring specifically to FIG. 2, the coin return of the present invention is preferably inserted into and held in an existing coin return opening 39 of the telephone paystation enclosure 33, as follows: the housing 12 is inserted into opening 39 until a pivot area 30 of the housing is aligned with and placed over the lower part of the opening 39. The housing 12 is then pivoted or rocked around pivot area 30, into the interior of the enclosure 33, until interior surface of outer lip 12a of the housing contacts the exterior of the enclosure 33 and an upper, deeper slotted opening 32, formed in housing 12, is aligned with the top surface of the opening 39. The housing 12 is then pushed upwardly until the top surface of opening 39 of enclosure 33 bottoms out in the deeper slotted opening 32. The bottom of housing 12 is then pushed or rocked inwardly, past pivot area 30, until the interior surface of outer lip 12a of the housing contacts the exterior of the enclosure 33 and a lower, shallower slotted opening 31, formed in housing 12, is aligned with the bottom surface of the opening 39. The housing 12 is then allowed to drop until shallower slotted opening 31 bottoms out against the bottom surface of opening 39. The housing may then be firmly held in position by means pressed against the upper surface of bracket 13, in a manner well known to those skilled in the art, and will then remain in the position shown in FIG. 2, until the steps described above are performed, in the reverse order, to remove the same.

Turning now to FIG. 3, there shown is a further embodiment 40 of the coin return of the present invention, which is substantially identical to that shown in FIG. 2. The same elements as those contained in the coin return 10 of FIG. 2 are identified with the same numerals in FIG. 4. It, therefore, can be seen that this embodiment includes all of the elements of coin return 10 except for spring means 14, and further includes a second, gravity actuated flap means 42, pivotably mounted to a pivot means 44 held in or formed to bracket 13. This pivotable second flap means 42 is shown as not extending all the way to and touching the coin slide 16 and is specifically sized and dimensioned to cooperate with the coin slide 16 to guide or rearrange any coins which may roll or otherwise be skewed when coming down the slide. Second flap means 42 is particularly useful to ensure that there is no chance of any coin backup or jam in those telephone paystations which dump or return large quantities of coins at one time (up to $5.00 worth in some situations).

Figure 4:
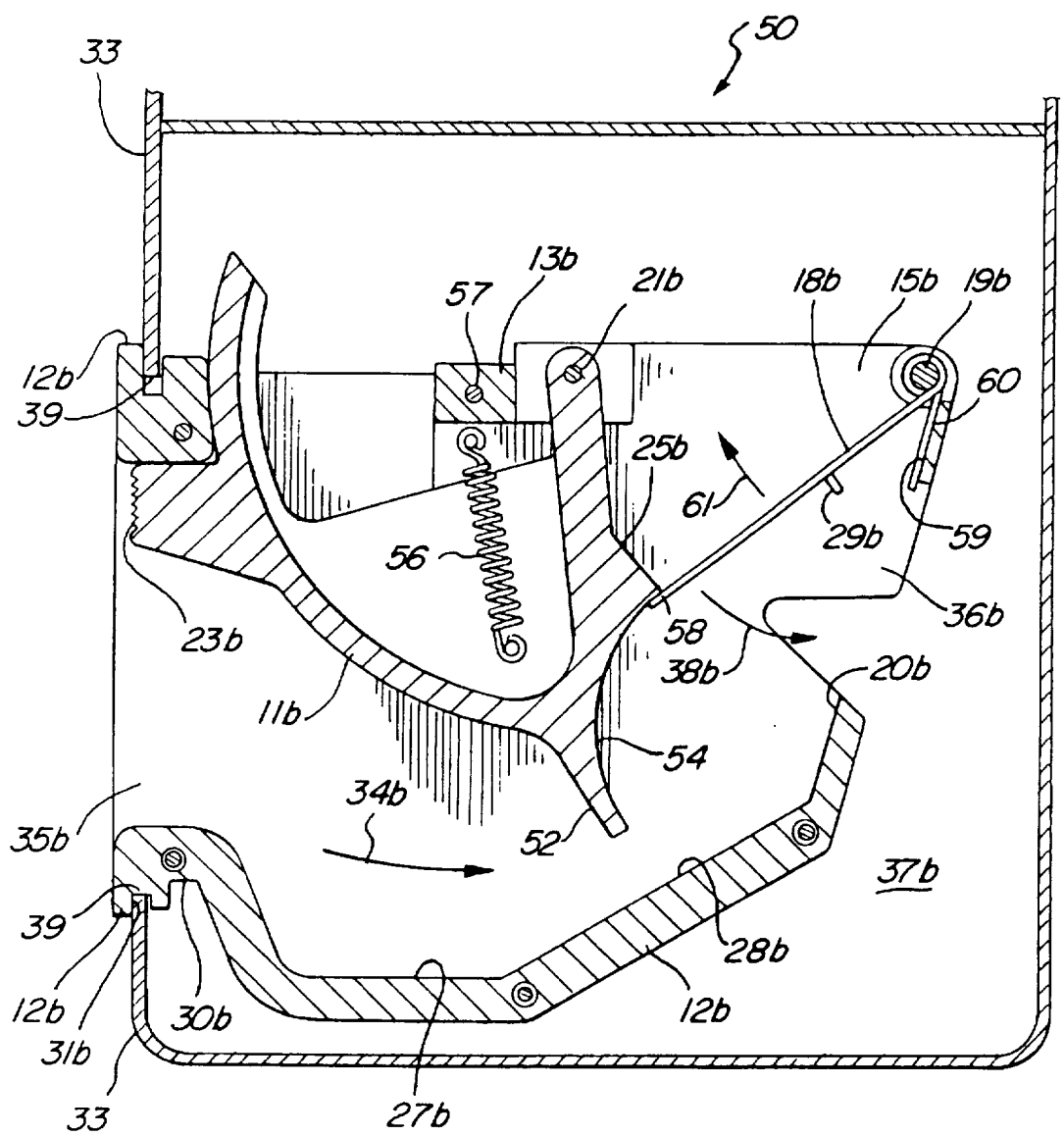
FIG. 4 is a sectional view of a still further embodiment of the improved coin return.

FIG. 4, shows a further embodiment 50 of the coin return of the present invention, which operates in a manner similar to that of the embodiment shown in FIG. 2. Similar elements as those contained in the coin return 10 of FIG. 2 are identified with the corresponding numerals plus the suffix "b" in this FIG. 4. It, therefore, can be seen that this embodiment includes most of the elements of coin return 10, such as an exterior housing 12b comprised of two halves or cooperating components fabricated in the same manner as housing 12, described above. The housing 12b is shown as being deeper, or extending further inwardly into the enclosure 33, so that it contains an elongated coin slide 28b which extends for a longer distance than the coin slide 28 of coin return 10, as explained more fully below. The housing 12b also lacks an exterior door, and includes a substantially arcuate outer sweep or flap means 11b, shaped and dimensioned so as to snugly fit into the rectangular interior of the housing 12b. The sweep means 11b is pivotably mounted about a pin or point 21b, and includes a downwardly depending leg portion 52 having an arcuate inner surface 54, forming a part of the coin path. As shown, this leg portion 52 is dimensioned so as to be spaced from elongated coin slide 28b to allow coins to pass under its outer end. However, leg 52 acts to sweep any materials inserted through the open front portion 35b of the housing 12b, and contacting the leg, out of the coin path or coin slide 28b. Any material contacted by and swept rearwardly by leg 52 will be pushed through a rear opening 36b, into a storage area or opening 37b in the telephone paystation enclosure. The sweep means 11b also includes a front actuating means or knob 23b which, when pushed, pivots the sweep means around the pivot pin 21b, in the direction of the arrow 34b. Biasing means, such as a spring 56, is mounted between an interior point of the sweep means 11b and a securing point 57 on a bracket 13b, or the like, in a known manner, to bias the sweep means assembly 11b into its rest position, as shown in FIG. 4. The sweep means 11b also includes an arcuate interior surface 25b, forming a portion of the coin path. The housing 12b is also securely mounted in the telephone paystation enclosure 33, in the same manner as described above.

The housing 12b does not include an internal coin slide or chute similar to that shown at 16 in FIGS. 2 and 3. The housing 12b does include a coin entry opening 15b, connected in a known manner to the normal coin return means from a telephone paystation in the enclosure 33. Therefore, when coins are dropped from the telephone paystation into opening 15b, they first contact and move flap 18b, pivotably mounted about pivot pin or point 19b formed to or adjacent the opening 15b, in housing 12b. The weight of the coins is sufficient to move flap 18b downwardly so the coins pass between the flap and the arcuate interior coin path portion 25b. Depending on the number of coins being returned, lower end 58 of flap 18b will be moved away from contact with the arcuate interior coin path 54, against the bias of a resilient arm 59 of flap 18b, pressed against a fixed surface 60 formed to or as part of the housing 12b. The flap 18b can be moved in the direction of the arrow 38b, until it touches or is stopped against wall 20b. The coins then drop past pivotable inner flap 18b until they contact slide 28b. The coins move down slide area 28b below the end of leg 52, and into an enlarged coin retrieval area or cavity 27b, capabable of receiving more coins. When all the coins pass by flap 18b, resilient arm 59 will move or return the flap, in the direction of arrow 61, until the flap comes to its rest position, as shown in FIG. 4. If for any reason the flap 18b is blocked or held in place, the coins will not pass by this flap, but will be backed-up or held in position behind the flap. Since this coin return 50 also includes an open front portion 35b, a person using the telephone paystation can see into the coin retrieval area 27b and operate the sweep means 11b in the same manner as sweep 11, or may retrieve the coins from enlarged coin retrieval area 27b, in the same manner asdescribed above. The components of the coin return 50 are fabricated in a manner identical to, or similar to those of coin returns 10 and 40.

Looking at FIG. 4, when the knob 23b of the sweep means 11b is pressed inwardly, in the direction of arrow 34b toward the rear opening 36b, the arcuate interior surface or coin path 54 of leg 52 will press against the lower or outer end 58 of interior flap 18b, to move flap 18b in the direction of the arrow 38b, until this lower end 58 and the end of leg 52 contact the stop portion or wall 20b, to thereby both stop movement thereof, and completely block-off the opening into the coin path and coin entry 15b. At the same time, any material in the coin slide area 28b contacted by the leg 52 or flap 18b will be pushed or swept through rear opening 36b and into compartment 37b.

Those skilled in the art will appreciate that the above-described preferred embodiments are subject to numerous modifications and adaptations without departing from the scope and spirit of the invention. Therefore, it is to be understood that, within the scope of the appended claims, the invention may be practiced other than as specifically described herein.

What is claimed is:

1. A method of inserting a coin return housing into an existing coin return opening of a telephone paystation enclosure, comprising the following steps:

inserting said coin return housing into said coin return opening formed in said telephone paystation enclosure until a pivot area of said coin return housing is aligned with and placed over a lower part of said coin return opening;

pivoting said coin return housing around said pivot area into the interior of said telephone paystation enclosure, until an upper interior surface of an outer lip of said coin return housing contacts the exterior of said telephone paystation enclosure and an upper slotted opening, formed in said coin return housing, is aligned with a top surface of said coin return opening;

pushing said coin return housing upwardly until the top surface of said coin return opening bottoms out in said upper slotted opening;

rocking the bottom of said coin return housing inwardly until it is past said pivot area and a lower surface of said outer lip of said coin return housing contacts the exterior of said telephone paystation enclosure, and a lower slotted opening formed in said coin return housing is aligned with a bottom surface of said coin return opening; and allowing said coin return housing to drop until said lower slotted opening bottoms out against said bottom surface of said coin return opening.

2. The method of claim 1, including the further step of securing said coin return housing in said telephone paystation to prevent removal therefrom.

3. A method of inserting a coin return housing into an existing coin return holder opening of a telephone paystation enclosure comprising the following steps:

selecting a telephone paystation enclosure having a correct size coin return holder opening;

forming a coin return housing with a top and a bottom;

inserting said coin return housing into the interior of said selected telephone paystation enclosure through said correct size coin return holder opening;

pushing said coin return housing upwardly, with respect to said correct size coin return holder opening, until a top surface of said coin return holder opening bottoms out in an upper opening in the top of said formed coin return housing;

rocking the bottom of said coin return housing; and allowing said coin return housing to drop into said correct size coin return holder opening until a further opening formed in the bottom of said coin return housing bottoms out against a lower surface of said correct size coin return holder opening.

4. The method of claim 3, wherein said forming step includes forming a pivot area in the bottom of said coin return housing to allow pivoting of said coin return housing when inserted into said correct size coin return holder opening, when said pivot area rests against said lower surface of said correct size coin return holder opening.

5. The method of claim 4, wherein said forming step includes forming an outer lip on said coin return housing.

6. The method of claim 5, wherein said inserting step includes resting said pivot area of said coin return housing against said lower surface of said correct size coin return holder opening and pivoting said coin return housing about said pivot area until said outer lip of said coin return housing contacts an exterior surface of said selected telephone paystation enclosure.

7. The method of claim 6, wherein said further opening is a slotted opening, and further including the step of aligning said slotted opening with a bottom surface of said correct size coin return holder opening prior to allowing said coin return housing to drop into said correct size coin return holder opening.

* * * * *